United States Patent [19]

van der Lely

[11] 4,088,196

[45] May 9, 1978

[54] SOIL CULTIVATING IMPLEMENTS

[76] Inventor: Cornelis van der Lely, 7, Brüschenrain, Zug, Switzerland

[21] Appl. No.: 674,165

[22] Filed: Apr. 6, 1976

[30] Foreign Application Priority Data

Apr. 11, 1975 Netherlands .......................... 7504319

[51] Int. Cl.² ........................................... A01B 21/06
[52] U.S. Cl. .................................. 172/155; 172/169; 172/175; 172/526
[58] Field of Search ................. 172/59, 155, 156, 157, 172/169, 174, 182, 526, 522, 523, 142, 707, 708, 63, 65, 49, 170, 172

[56] References Cited

U.S. PATENT DOCUMENTS

| 441,851 | 12/1890 | Monroe | 172/169 |
|---|---|---|---|
| 487,933 | 12/1892 | Morgan | 172/523 |
| 2,490,237 | 12/1949 | Silver | 172/707 |
| 2,699,023 | 1/1955 | Caldwell | 172/526 |
| 2,976,939 | 3/1961 | Lely | 172/522 |
| 3,131,774 | 5/1964 | Lely | 172/526 |
| 3,209,841 | 10/1965 | Lely | 172/142 |
| 3,667,551 | 6/1972 | Lely | 172/59 |
| 3,774,688 | 11/1973 | Lely et al. | 172/526 |
| 3,937,460 | 2/1976 | Lely | 172/59 |
| 3,946,816 | 3/1976 | Lely | 172/65 |

FOREIGN PATENT DOCUMENTS

| 628,635 | 6/1963 | Belgium | 172/526 |
|---|---|---|---|
| 479,538 | 7/1929 | Germany | 172/59 |

*Primary Examiner*—Richard J. Johnson
*Attorney, Agent, or Firm*—Mason, Mason & Albright

[57] ABSTRACT

A cultivator implement has a row of freely rotatable soil working members connected to a transverse frame beam by brackets. The members each have a stub shaft secured to an inclined web of a corresponding bracket so that the axis of rotation of each member is inclined to the vertical. Pairs of downwardly extending tines on support plates contact the ground and rotate the members. Between adjacent rotatable members, a cultivator tine is deflectably secured to the beam via an integral spring coil assembly. The cultivator tine is located non-centrally between rotary members and each tine is curved so that its lower tip extends forwardly. A soil working roller is positioned to the rear of the rotary members and is vertically adjustable on arms connected to the ends of the beam.

4 Claims, 4 Drawing Figures

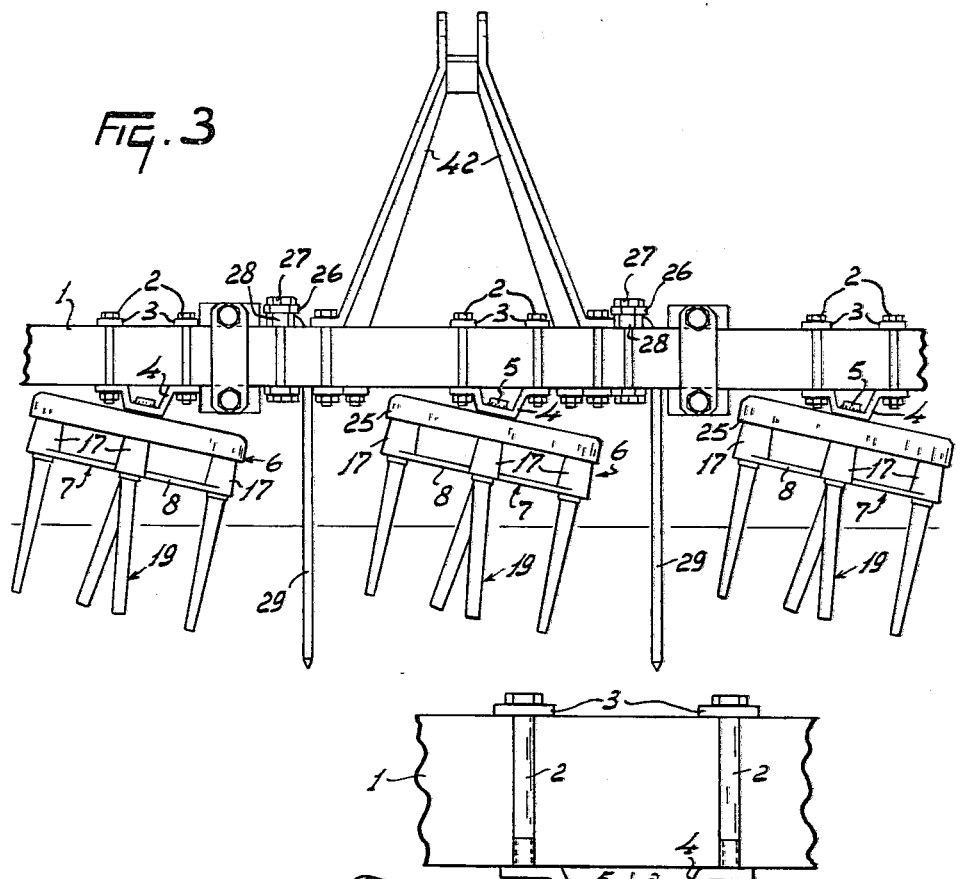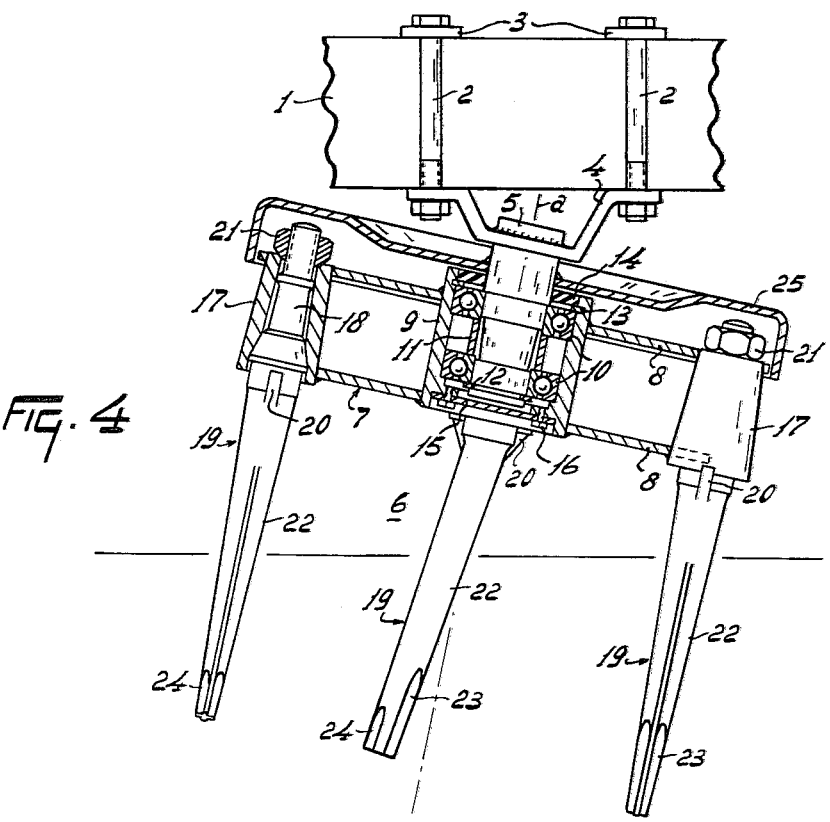

SOIL CULTIVATING IMPLEMENTS

Figure 1:
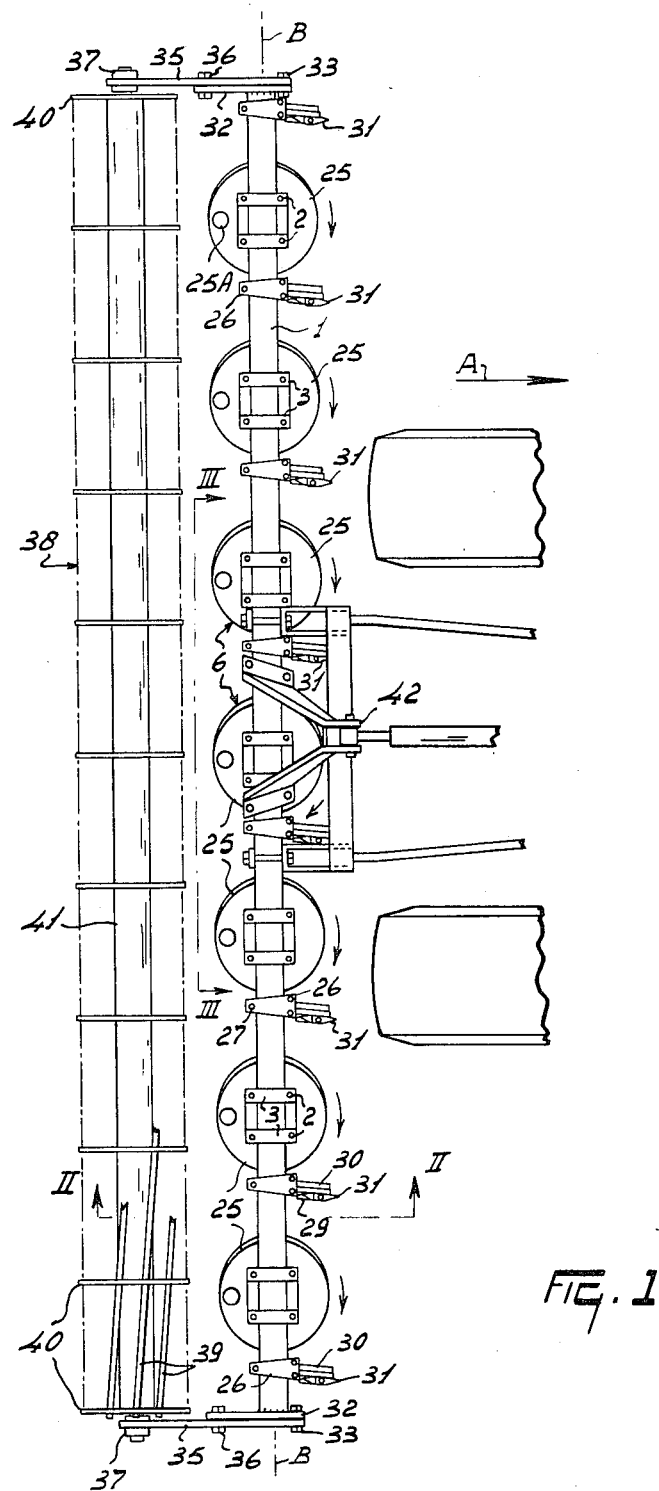
Figure 2:
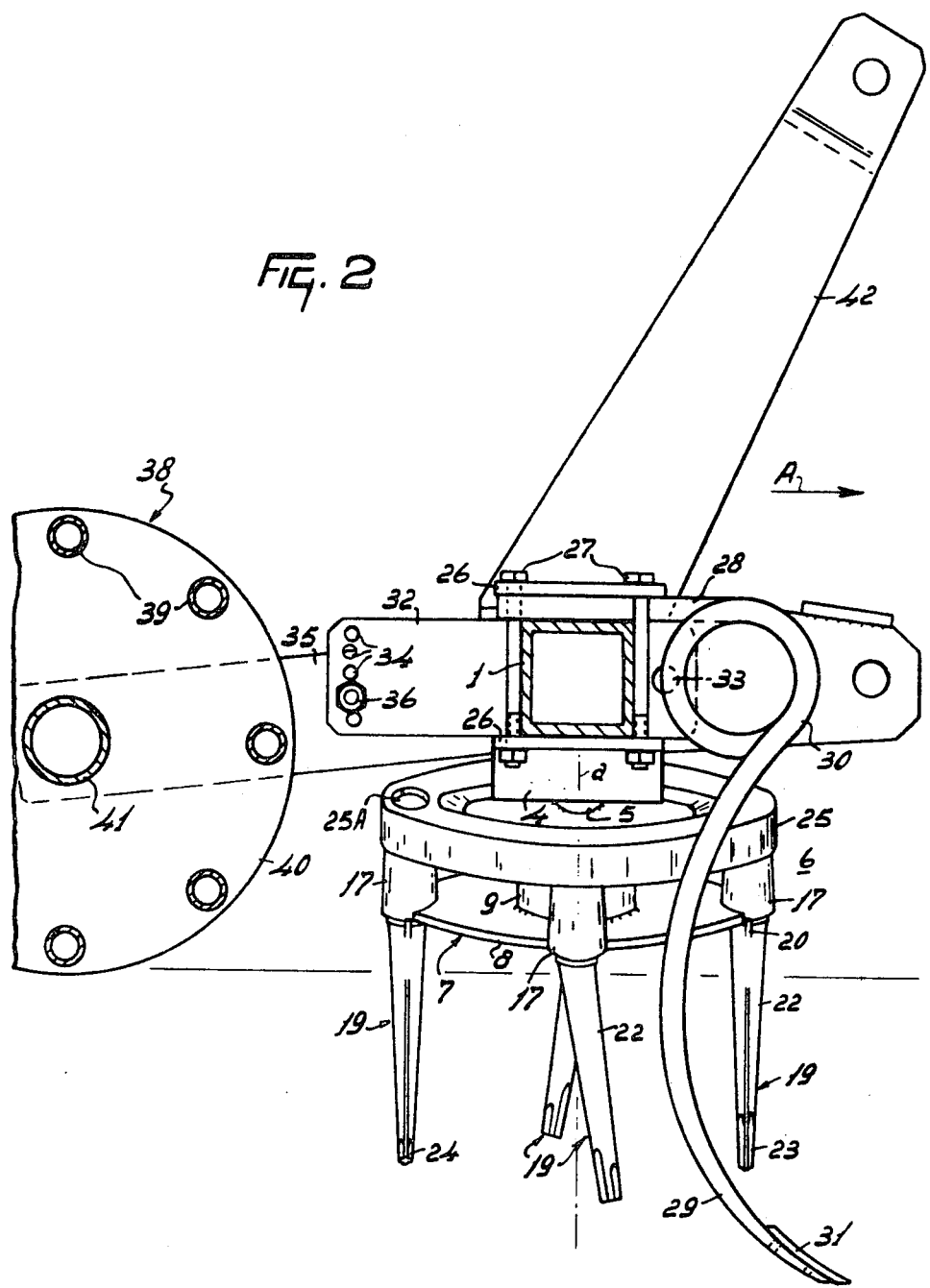

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a section, to an enlarged scale, taken on the line II—II in FIG. 1, FIG. 3 is a rear elevation, to an enlarged scale, of parts of the implement as seen in the direction indicated by arrows III—III in FIG. 1 and FIG. 4 is a part-sectional elevation, to an enlarged scale, illustrating the construction and arrangement of one soil working or cultivating member of the implement in greater detail.

Referring to the drawings, the soil cultivating implement that is illustrated is in the form of a rotary harrow that comprises a frame portion 1 which extends substantially horizontally transverse, and normally substantially horizontally perpendicular, to the intended direction of operative travel of the implement which is indicated by an arrow A in FIGS. 1 and 2 of the drawings. The frame portion 1 is afforded principally by a hollow beam of polygonal cross-section, a square cross-section, as illustrated, being preferred. Whether or not the polygonal cross-section that is chosen for the beam is square, said beam is so arranged that at least one flat side thereof is substantially horizontally disposed (see FIG. 2). A plurality, of which there are seven in the example that is being described, of brackets 4 are firmly clamped to the lower substantially horizontal side of the beam that principally affords the frame portion 1, said brackets 4 being regularly spaced apart from one another along the length of the beam and each bracket 4 being firmly retained in its appointed position by four clamping bolts 2 that co-operate, at the top of the beam, with two clamping plates 3 that both extend substantially parallel to the direction A in spaced apart relationship. It will be seen from FIGS. 3 and 4 of the drawings that each bracket 4 has two limbs that both extend substantially parallel to the direction A at a short distance from one another. Each bracket 4 is of asymmetrical channel-shaped configuration with one limb thereof longer (from top to bottom) than the other so that the web interconnecting the two limbs has its general plane in inclined relationship with the horizontal. The web or base of each bracket 4 has the upper end of a corresponding strong stub shaft 5 welded or otherwise rigidly secured to it so that each stub shaft 5 projects downwardly from the corresponding web or base with its longitudinal axis $a$ inclined at an angle of substantially 10° to the strictly vertical as a result of the non-horizontal dispositions of the webs or bases of the brackets 4. Each stub shaft 5 tapers downwardly away from the corresponding bracket 4 and is formed with shoulders for the rotatable mounting of a corresponding soil working or cultivating member 6 whose axis of rotation is coincident with the longitudinal axis $a$ of the stub shaft 5 concerned. The longitudinal axis of the hollow beam which principally affords the frame portion 1 and the longitudinal axes $a$ of the seven (in this embodiment) stub shafts 5 are contained in a vertical plane B—B that is perpendicular to the intended direction of operative travel A. It will be noted from the drawings, and particularly from FIG. 3 thereof, that the longitudinal axes $a$ of the stub shafts 5, which are also the axes of rotation of the corresponding members 6, are all in substantially parallel relationship with one another, that is to say, they are all obliquely inclined downwardly from the frame portion 1 towards the ground surface in the same direction.

Each soil working or cultivating member 6 comprises a support that is generally indicated by the reference 7, the support including upper and lower parallel plates 8 that are both of annular configuration and both of which are perpendicular to the corresponding axis $a$. The inner edges of the annular plates 8 are both welded or otherwise rigidly secured to the outer surface of a cylindrical hub 9 which is freely rotatable around the corresponding stub shaft 5 with the aid of upper and lower ball bearings 10 whose inner races co-operate with the aforementioned shoulders on the tapering stub shafts 5. The inner races of the upper and lower ball bearings 10 are maintained in spaced apart relationship by an intervening sleeve 11, the inner race of the lower bearing 10 abutting against a circlip 12 that is engaged in a groove in the stub shaft 5 and the outer race of the upper ball bearing 10 abutting against a larger circlip 13 that is engaged in a groove in the inner wall of the cylindrical hub 9. As will be evident from a study of FIG. 4 of the drawings, the lower ends of the outer races of both the upper and lower ball bearings 10 are also lodged against supporting shoulders formed in the inner surface of the cylindrical hub 9. The upper surface of the upper large circlip 13 supports, from beneath, an annular closure plate or seal 14 which is disposed just inside the upper end of the cylindrical hub 9 in surrounding relationship with the stub shaft 5. Small bolts 16 secure a generally circular closure plate 15 to an inwardly directed lip of the hub 9 so that said closure plate 15 extends perpendicular to the corresponding axis $a$ immediately beneath the lower end of the corresponding stub shaft 5 and thus seals the bearings 10 from contamination by dirt from the bottom of the hub 9.

The plates 8 of each support 7 are provided, at regular 90° intervals around the corresponding axis $a$, with four generally sleeve-shaped tine holders 17 whose outer surfaces are substantially frusto-conical in an upwardly tapering direction. The four holders 17 that correspond to each member 6 are arranged at substantially the peripheries of the corresponding plates 8 and each holder 17 receives a fastening portion 18 of a corresponding rigid tine 19. The open lower end of each holder 17 is formed with a pair of diametrically opposed notches or recesses and those notches or recesses co-operate with similarly disposed lugs 20 that are integrally carried at opposite sides of the corresponding tine 19. This arrangement prevents the fastening portion 18 of the tine 19 from turning about its own longitudinal axis in the holder 17 once a frusto-conically faced fastening nut 21 which co-operates with a screw-threaded upper part of the portion 18 is securely tightened. In addition to its straight fastening portion 18, each tine 19 also comprises a straight soil working portion 22 that extends downwardly away from an integral junction with the fastening portion 18 in such a way that the longitudinal axes of said two portions 18 and 22 are inclined to one another by a small angle which conveniently, but not essentially, has a magnitude of substantially 8°. Small arrows appear in FIG. 1 of the drawings to indicate the directions in which the freely rotatable members 6 will normally revolve during the use of the implement and an examination of the other figures of the drawings will make it clear that the soil working portions 22 of the tines 19 are inclined rearwardly from top to bottom relative to those directions so that said portions of the tines may be considered as trailing to some extent with respect to the directions of rotation concerned. As will be further discussed below, rotation of the members 6 in the indicated directions is brought about, during operative travel of the implement in the direction A, because the portions 22 of the tines which, at any instant, are located at one side of each corresponding axis $a$ penetrate to a considerably greater depth into the soil than do the tine portions 22 which, at the same instant, are at the opposite sides of the corresponding axes $a$.

Each soil working portion 22 of each tine 19 is of downwardly tapering configuration and commences, at substantially its integral junction with the corresponding fastening portion 18, with a substantially circular cross-section. Considered downwardly towards the free end of tip from that junction, the portion 22 gradually changes its cross-sectional shape until, near the lowermost free end or tip, that shape is basically, although not strictly, rectangular. In this lower region, the portion 22 is considerably flattened in such a way that a diagonal between those two opposite corners of the basically rectangular cross-section that are furthest apart is tangential to a circle centered upon the corresponding axis $a$. Again in a lowermost free end region of each portion 22, the four what would otherwise be substantially flat sides of that portion are formed with recesses or grooves 23 and 24 which extend upwardly along the corresponding portion 22 from its lowermost free end or tip to merge, at their upper ends, into the corresponding four substantially flat sides of the portion 22. It will be noted from FIGS. 2 and 4 of the drawings that the two recesses or grooves 23 that face generally forwardly from each tine portion 22 with respect to the intended direction of operative rotation of the corresponding member 6 have substantially twice the upright length of those two recesses or grooves 24 which face generally rearwardly with respect to the same direction. The recesses or grooves 23 and 24 become progressively shallower as the distance from the lowermost free end or tip of the corresponding tine portion 22 increases before, as mentioned above, said recesses or grooves finally merge into the substantially flat sides of the portion 22 concerned. Although it is greatly preferred that the lower region of the soil working portion 22 of each tine 19 should be of basically rectangular cross-section, this is not absolutely essential and it is possible for other polygonal cross-sections to be employed in substitution.

Each stub shaft 5 has a corresponding protective hood or cover 25 of annular shape welded or otherwise rigidly secured to it at a short distance below the corresponding bracket 4 and immediately above the upper end of the corresponding rotatable hub 9. The hood or cover 25 protects the upper end of the hub 9 concerned and also the upper ends of the corresponding four tine holders 17 together with the corresponding fastening nuts 21 and the screw-threaded parts of the tine fastening portions 18 with which those nuts co-operate. Each hood or cover 25 is, however, formed with a single hole 25A (FIGS. 1 and 2) through which access can be obtained to any one of the four corresponding fastening nuts 21 merely by turning the member 6 concerned about its axis of rotation $a$ untill the required nut is in register with the access hole 25A. It can be seen in FIG. 1 of the drawings that the brackets 4 which correspond to those two soil working or cultivating members 6 which are at the opposite ends of the single row thereof are spaced from the corresponding ends of the beam which principally affords the frame portion 1 by distances which are substantially half the distance between each bracket 4 and its neighbour or one of its neighbours. A plurality of cultivator tines 29, of which there are eight in the example that is being described, are arranged at intervals across the width of the implement, there being one of the tines 29 close to each opposite end of the beam that principally affords the frame portion 1 and one tine 29 between each successive pair of soil working or cultivating members 6. Each cultivator tine 29 comprises a substantially horizontally disposed fastening portion 28 that is clamped firmly, but releasably, against the top of the hollow beam of the frame portion 1 by a corresponding upper clamping plate 26, a corresponding lower clamping plate 26 and a group of three bolts 27. The rearmost bolt 27, with respect to the direction A, of each group is entered downwardly through a hole near the rear end of the corresponding tine fastening portion 28 so that the tine 29 concerned shall still remain connected to the frame portion 1 even if its three bolts 27 should become loose. Each cultivator tine 29 is preferably formed integrally with its fastening portion 28 and with an intervening helical coil 30 that preferably comprises not less than two complete 360° turns. The integral assembly of parts 28, 29 and 30 may conveniently be formed from a single length of spring steel or other resilient material which has a polygonal cross-section that it is preferred, as illustrated, should be square. Each coil 30 affords a resilient support for the corresponding cultivator tine 29 and it will be seen from FIG. 2 of the drawings that each tine 29 is initially inclined downwardly and rearwardly with respect to the direction A from its junction with the corresponding coil 30 where after it is arcuately curved in a regular manner in such a way that a lower region thereof is inclined downwardly and forwardly with respect to the direction A. The downwardly and forwardly extending region is gently tapered towards its free end or tip and is provided with a replaceable blade 31 which is retained in its operative position on the tine 29 by a pair of countersunk machine screws or the like. If desired, the blades 31 can be formed in such a way that they are reversible, end-for-end, so that, when the initial cutting edge becomes blunt, reversal can be effected to present a fresh sharp cutting edge thus effectively doubling the life of each blade 31 before inevitable wear eventually makes complete replacement necessary. It will be noted from the drawings that, with respect to the direction A, the coil 30 that corresponds to each cultivator tine 29 is located wholly or principally behind at least upper and lower end regions of that tine 29.

Reference to FIG. 1 of the drawings will show that, in plan view, the fastening portions 28 are not located midway between the successive pairs of soil working or cultivating members 6 but are nearer to the members 6 which are to the left thereof when the implement is viewed from the rear in the direction A (see FIG. 3). This applies to all of the cultivator tine fastening portions 28, except, of course, that one which is very close to the extreme lefthand end of the frame portion 1 when the implement is viewed in the manner just indicated.

The opposite ends of the hollow beam of the frame portion 1 have vertical end plates 32 that are both parallel to the direction A secured to them so that said plates 32 extend principally rearwards from said beam relative to the direction A. Short portions of the plates 32 that project forwardly from said beam carry horizontally aligned strong pivot bolts 33, or equivalent stub shafts, and two arms 35 are turnable upwardly and downwardly alongside the corresponding plates 32 about the axis defined by the pivot bolts 33. The plates 32 are formed, near their rearmost edges, with rows of holes 34 each of which holes is at the same distance from the axis defined by the pivot bolts 33 and each arm 35 is formed with at least one hole that can be brought into register with any chosen one of the holes 34 by bringing that arm 35 to an appropriate angular position about said axis. Bolts 36 are provided for entry through the selected holes 34 and the holes in the arms 35 and, when tightened, said bolts 36 tightly clamp the arms 35 in the chosen angular positions about the axis defined by the pivot bolts 33. The arms 35 project rearwardly with respect to the direction A beyond the end plates 32 and, between their rearmost ends, substantially horizontally aligned bearings 37 rotatably carry an open-formation ground roller 38 that is arranged to be rotated freely by ground contact during operative progress of the implement in the direction A. The axis of rotation that is defined by the bearings 37 is substantially perpendicular to the length of the hollow beam of the frame portion 1 and thus substantially perpendicular to the direction A. The roller 38 comprises a central axially disposed tubular support 41 to which a plurality, such as eleven, of vertical plates 40 of circular formation are secured at regular intervals so that all of them are parallel to the direction A. A plurality, such as eight, of holes are formed close to the periphery of each plate 40 and elongated elements 39 which may be of solid rod formation, or of tubular formation as illustrated, are entered through the holes in the successive plates 40 so as to extend helically around the axis of rotation of the roller 38 at regular angular intervals around that axis. The roller 38 primarily serves two functions; firstly, it acts as a soil working member which will crush any large lumps of soil left on the ground surface by the foregoing cultivator tines 29 and members 6 with a concurrent gentle smoothing and compressing effect upon the already worked soil and, secondly, it serves a depth control function inasmuch as the level of its axis of rotation that is chosen relative to the level of the frame portion 1 substantially determines the maximum depth to which the tines 19 of the members 6 and the cultivator tines 29 can penetrate into the ground (see particularly FIG. 2). The frame portion 1 is provided, centrally across the width of the implement and at the front thereof with respect to the direction A, with a coupling member or trestle 42 that is arranged for pivotal connection to the three ends of the upper and lower lifting links of a three-point lifting device or hitch carried at the rear of an agricultural tractor or other operating vehicle in a manner which is generally known per se and which can be seen, in outline, in FIG. 1 of the drawings.

In the use of the soil cultivating implement that has been described, its coupling member or trestle 42 is connected to the three-point lifting device or hitch at the rear of an agricultural tractor or other operating vehicle and is supported from the ground by that lifting device or hitch, by the ground roller 38 and by the tines 19 and 29, said tines penetrating into the soil to a depth that is dictated principally by the angular positions in which the arms 35 have been set by the bolts 36 about the axis defined by the pivot bolts 33. As the implement moves forwardly in the direction A, its cultivator tines 29 are dragged through the soil while the members 6 rotate more or less regularly and more or less continuously in the directions (which are the same for all of them) that are indicated by small arrows in FIG. 1 of the drawings. As briefly discussed above, the rotation of the members 6 is caused by ground contact alone and results from the fact that, as seen in FIGS. 3 and 4, the portions 22 of those tines 19 which, at any distant, are to the right of the corresponding axes $a$, penetrate into the ground to a significantly greater extent than do the portions 22 of those tines 19 which, at the same instant, are to the left of the corresponding axes $a$. Thus, the resistance to dragging motion through the soil at the right-hand side of each axis $a$ is greater than to the left-hand side thereof and the members 6 consequently revolve about the axis $a$. Clearly, should one of the tine portions 22 that is to the left-hand side of the corresponding axes $a$ meet a substantially immovable obstacle, such as a firmly embedded stone, the direction of rotation of the member 6 concerned will be temporarily reversed until the obstacle has been avoided, this being conducive to the avoidance of breakage of the tines 19 and to a long working life of each member 6. The members 6 work the strips of land that are located between the cultivator tines 29, coarse lumps of soil that are displaced by those tines 29 onto said strips being crumbled up by the members 6 so that the cultivator tines 29 co-operate effectively with the rotary ground-actuated soil working or cultivating members 6.

The implement that has been described, and that is illustrated in the accompanying drawings, is particularly, but not exclusively, useful for the cultivation of land that is badly infested with weeds and or grass and-/or that is contaminated with refuse from previous crops. The long roots of invasive grasses are torn out by the cultivator tines 29 and tend to be scraped off those tines 29 by the co-operating tines 19 of the neighbouring members 6 which pass them rearwardly towards the roller 38. The uprooted and crushed weeds and grass are left lying mainly on the soil surface to the rear of the implement to die off prior to any further work that may be required in preparation for the next crop that is to be grown on the land. The protective hoods or covers 25 effectively prevent any significant quantities of crop debris, grass, weeds and so on from becoming tightly wound around the tops of the members 6 to such an extent as to interfere significantly with their effective operation. Under many circumstances, a single traverse of the land by the soil cultivating implement that has been described is sufficient to bring that land to a condition suitable for use, without further treatment, as a seed bed or as a bed for the reception of young plants.

Although certain features of the soil cultivating implement that have been described and/or that are illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings, both individually and in various combinations.

What we claim is:

1. A soil cultivating implement comprising a frame and a transverse row of soil working members rotatably mounted on respective stub shafts that define upwardly extending axes, each soil working member having downwardly extending tines positioned around its axis of rotation and being freely rotatable about its corresponding axis responsive to the contact of its tines with the ground, said soil working members being releaseably fastened with respective brackets on an elongated beam that extends transverse to the direction of travel, the stub shafts of said soil working members being held in said brackets, said brackets being positioned directly below said beam and being obliquely inclined to the vertical, said shafts being substantially parallel to one another and located in a transverse plane that extends substantially perpendicular to the normal direction of implement travel, each of said brackets being channel shaped with a base positioned between limbs, said limbs having dissimilar vertical lengths and said base being inclined to the horizontal, a respective stub shaft being journalled in said base, said tines each having a substantially straight soil working portion that in the lowest position of the tine, extends obliquely forwardly with respect to the front of the machine, a ground engaging roller being positioned to the rear of said row of soil working members and said roller being connected to the frame and supporting same, said roller extending at least partly across the working width of the implement, the axis of rotation of said roller extending substantially horizontal and parallel to said plane.

2. An implement as claimed in claim 1, wherein there are four tines positioned at 90° intervals around said axis of rotation.

3. Am implement as claimed in claim 1, wherein a cultivator tine is secured to said beam between neighboring soil working members and said tine is resilient.

4. An implement as claimed in claim 3, wherein said tine is positioned nearer the axis of rotation of one soil working member than the axis of rotation of the neighboring soil member.

* * * * *